(12) United States Patent
Jawurek et al.

(10) Patent No.: US 8,880,867 B2
(45) Date of Patent: Nov. 4, 2014

(54) FAULT-TOLERANT PRIVACY-PRESERVING STATISTICS

(75) Inventors: Marek Jawurek, Mannheim (DE); Florian Kerschbaum, Karlsruhe (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/445,599

(22) Filed: Apr. 12, 2012

(65) Prior Publication Data

US 2013/0275743 A1     Oct. 17, 2013

(51) Int. Cl.
    *H04L 29/06*     (2006.01)

(52) U.S. Cl.
    USPC ........... 713/150; 713/201; 380/149; 380/150; 709/225; 709/229

(58) Field of Classification Search
    CPC .......... H04H 20/14; H04L 9/00; H04L 9/008; G06F 9/44; G01N 33/18
    See application file for complete search history.

(56) References Cited

U.S. PATENT DOCUMENTS

| | | | |
|---|---|---|---|
| 2004/0230443 A1* | 11/2004 | McMorris et al. | 705/1 |
| 2011/0211692 A1* | 9/2011 | Raykova et al. | 380/46 |
| 2011/0264920 A1* | 10/2011 | Rieffel et al. | 713/189 |
| 2012/0015665 A1* | 1/2012 | Farley et al. | 455/456.1 |
| 2012/0039473 A1* | 2/2012 | Gentry et al. | 380/277 |
| 2012/0066510 A1* | 3/2012 | Weinman | 713/189 |
| 2012/0201378 A1* | 8/2012 | Nabeel et al. | 380/255 |
| 2012/0314854 A1* | 12/2012 | Waters | 380/28 |
| 2013/0010950 A1* | 1/2013 | Kerschbaum | 380/30 |

OTHER PUBLICATIONS

J.-M. Bohli, O. Ugus, and C. Sorge, "A privacy model for smart metering." In Proceedings of the First IEEE International Workshop on Smart Grid Communications (in conjunction with IEEE ICC 2010), 2010.

T.-H. H. Chan, E. Shi, and D. Song, "Privacy-preserving stream aggregation with fault tolerance." In Proceedings of the 16th International Conference on Financial Cryptography and Data Security, FC '12, 2012.

I. Damgard and M. Jurik, "A generalisation, a simplification and some applications of paillier's probabilistic public-key system." In Proceedings of the 4th International Workshop on Practice and Theory in Public Key Cryptography, PKC Dec. 2000.

G. Danezis, M. Kohlweiss, and A. Rial, "Differentially private billing with rebates." Cryptology ePrint Archive, Report 2011/134, 2011. http://eprint.iacr.org/.

C. Dwork, Differential privacy. In in ICALP, pp. 1-12. Springer, 2006.

F. Garcia and B. Jacobs. "Privacy-friendly energy-metering via homomorphic encryption." In Proceedings of the 6th International Workshop on Security and Trust Management, 2010.

(Continued)

*Primary Examiner* — Philip Chea
*Assistant Examiner* — Khoi Le
(74) *Attorney, Agent, or Firm* — Fountainhead Law Group PC (57) ABSTRACT

Disclosed is a protocol for a fault-tolerant, private distributed aggregation model that allows a data consumer to calculate unbounded statistics (weighted sums) over homomorphically encrypted sensitive data items from data producers. The data consumer can choose to calculate over an arbitrary subset of all available data items, thus providing fault tolerance; i.e., failing data producers do not prevent the statistics calculation. A key-managing authority ensures differential privacy before responding to the data consumer's decryption request for the homomorphically encrypted statistics result, thus preservation the data's producer's privacy. Security against malicious data consumers is provided along with aggregator obliviousness, differential privacy in a unidirectional communication model between data producers and data consumers.

18 Claims, 6 Drawing Sheets

(56) References Cited

OTHER PUBLICATIONS

A. Ghosh, T. Roughgarden, and M. Sundararajan, "Universally utility-maximizing privacy mechanisms." In Proceedings of the 41st annual ACM symposium on Theory of computing, STOC '09, pp. 351-360, New York, NY, USA, 2009. ACM.

O. Goldreich and A. Warning, "Secure multi-party computation," 1998.

G. Hart, "Nonintrusive appliance load monitoring." Proceedings of the IEEE, 80(12):1870-1891, Dec. 1992.

G. W. Hart, "Residential energy monitoring and computerized surveillance via utility power flows." IEEE Technology and Society Magazine, Jun. 1989.

W. Heck, "Smart energy meter will not be compulsory." NRC Handelsblad (online), Apr. 2009. http://www.nrc.nl/international/article2207260.ece/Smart_energy_meter_will_not_be_compulsory.

A. Jamieson, "Smart meters could be 'spy in the home'." Telegraph (UK) (online), Oct. 2009. http://www.telegraph.co.uk/finance/newsbysector/energy/6292809/Smart-meters-could-be-spy-in-the-home.html.

M. Jawurek, M. Johns, and F. Kerschbaum. Plug-in privacy for smart metering billing. CoRR, abs/1012.2248, 2010.

M. Jawurek, M. Johns, and K. Rieck, "Smart metering de-pseudonymization." In ACSAC, pp. 227-236, 2011.

K. Kursawe, G. Danezis, and M. Kohlweiss, "Privacy-friendly aggregation for the smart-grid." In S. Fischer-Hubner and N. Hopper, editors, PETS, vol. 6794 of Lecture Notes in Computer Science, pp. 175-191. Springer, 2011.

H. Lam, G. Fung, and W. Lee, "A novel method to construct taxonomy electrical appliances based on load signatures of." Consumer Electronics, IEEE Transactions on, 53(2):653-660, May 2007.

C. Laughman, K. Lee, R. Cox, S. Shaw, S. Leeb, L. Norford, and P. Armstrong, "Power signature analysis. Power and Energy Magazine," IEEE, 1(2):56-63, Mar.-Apr. 2003.

M. A. Lisovich, D. K. Mulligan, and S. B. Wicker, "Inferring personal information from demand-response systems." IEEE Security and Privacy, 8(1):11-20, 2010.

F. McSherry. "Privacy integrated queries: an extensible platform for privacy-preserving data analysis." Commun. ACM, 53(9):89-97, 2010.

A. Molina-Markham, P. Shenoy, K. Fu, E. Cecchet, and D. Irwin, "Private memoirs of a smart meter." In Proceedings of the 2nd ACM Workshop on Embedded Sensing Systems for Energy-Efficiency in Building, BuildSys '10, pp. 61-66, New York, NY, USA, 2010. ACM.

P. Paillier, "Public-key cryptosystems based on composite degree residuosity classes." In in Advances in Cryptology—Eurocrypt 1999, pp. 223-238. Springer-Verlag, 1999.

R. Petrlic, "A privacy-preserving concept for smart grids." In Sicherheit in vernetzten Systemen: 18. DFN Workshop, pp. B1-B14. Books on Demand GmbH, 2010.

A. Prudenzi, "A neuron nets based procedure for identifying domestic appliances pattern-of-use from energy recordings at meter panel." In Power Engineering Society Winter Meeting, 2002. IEEE, vol. 2, pp. 941-946 vol. 2, 2002.

V. Rastogi and S. Nath, "Differentially private aggregation of distributed time-series with transformation and encryption." In Proceedings of the 2010 international conference on Management of data, SIGMOD '10, pp. 735-746, New York, NY, USA, 2010. ACM.

A. Rial, and G. Danezis, "Privacy-preserving smart metering." Technical report, Microsoft Research, Nov. 2010.

E. Shi, T.-H. H. Chan, E. G. Rieffel, R. Chow, and D. Song, "Privacy-preserving aggregation of time-series data." In NDSS, 2011.

\* cited by examiner

FAULT-TOLERANT PRIVACY-PRESERVING STATISTICS

BACKGROUND

Unless otherwise indicated herein, the approaches described in this section are not prior art to the claims in this application and are not admitted to be prior art by inclusion in this section.

In the smart energy grid (e.g., electrical grid) industry, conflicts exist between the consumers' concerns for privacy and the need for utility service providers to collect usage data (via smart utility meters) on their customers in order to optimize the delivery of energy. Utility providers can use real-time household electricity consumption data to forecast future consumption. Being able to forecast energy consumption allows the utility provide more efficient and more stable operation of the electrical grid. However, real-time consumption data may be deemed unacceptably intrusive. Studies have shown that information about a household and its inhabitants can be inferred if high-resolution energy consumption data is available. Thus, for the consumer, the real-time monitoring of consumption data represents an invasion of privacy.

In addition to real-time monitoring, solutions for forecasting consumption and otherwise managing the delivery of energy should not be susceptible to failing smart meters or communication links. A single failure should not prevent the real-time calculation of statistics.

More generally, the ability to calculate statistics in real-time, i.e., in the presence of failures, can also benefit many other real-world applications like public health and clinical research on patient information or any data collection and monitoring where privacy sensitive data is processed.

DETAILED DESCRIPTION

In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

Figure 1:
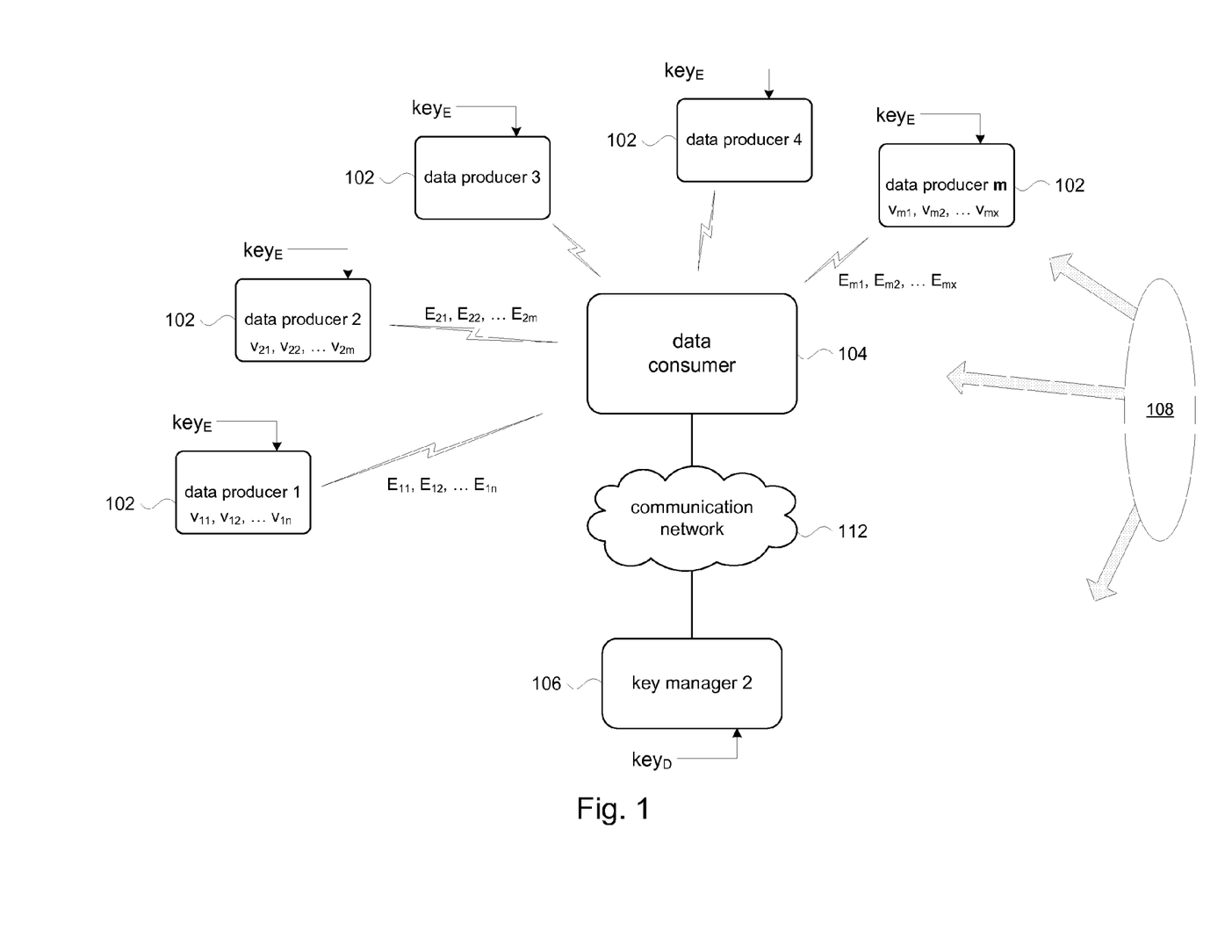
FIG. 1 illustrates a high level view of the present disclosure.

FIG. 1 shows a system for computing statistics collected from among a plurality of data producers 102. Each data producer 102 generates a series of data items. For example, data producer 1 may produce data items $v_{11}, v_{12}, \ldots v_{1n}$. In general, data producer m may produce data items $v_{m1}, v_{m2}, \ldots v_{mx}$. Each data producer 102 may produce data items asynchronously with respect to any other data producer. In an embodiment, the data producers 102 may be smart utility meters associated with a dwelling, a business, and the like. In another embodiment, the data producers 102 may be participants in a scientific (e.g., medical) study. For example, each participant may have a device that collects some information about the participant; e.g., their blood sugar level for a drug study, their geographic location for a sociological study, and so on.

In some embodiments, each data producer 102 may be provided with an encryption key ($key_E$) for encrypting each data item v before it is transmitted as encrypted data items E. As will be explained in more detail below, the encryption key ($key_E$) is part of a cryptographic component of a homomorphic cryptographic system 108. In accordance with the present disclosure, each data producer 102 is provided with the same encryption key ($key_E$) so that all data producers encrypt their data items v using the same encryption key. The encryption key ($key_E$) may be provided to each data producer 102 in any of several ways. The encryption key ($key_E$) may be pre-programmed in the data producer 102; e.g., stored in non-volatile memory such as flash memory or an programmable read-only memory (PROM). The encryption key ($key_E$) may be downloaded from a key manager (e.g., key managing authority 106). Going forward, the term "data items" v will either be understood as referring to their encrypted form ("ciphertext") or to their unencrypted ("plaintext") form, depending on the context of the discussion.

A data consumer 104 is in communication with each data producer 102 to receive data items v from each data producer. The data consumer 104 may be the utility provider, or a research center, and so on. Typically, a round of data collection is performed where encrypted data items v from each data producer 102 are received by the data consumer 104. A computation is performed and recorded by the data consumer 104, and the process is repeated for subsequent rounds of data collection. The resulting accumulation of computed statistics may then be used by the data consumer 104 to further its goals.

In some embodiments, the communication channel between each data producer 102 and the data consumer 104 is unidirectional; i.e., communication is only from the data producer to the data consumer. This allows for a less complex data producer 102. In some embodiments, the data producer 102 may be equipped with only a transmitter, thus guaranteeing that the data producer cannot receive incoming data. In other embodiments, the data producer 102 may have a receiver that is configured, for example, to occasionally receive new encryption keys ($key_E$) from an external source but is otherwise incapable of communicating with the data consumer 104.

The communication channels between data producers 102 and the data consumer 104 may take on any suitable form. The communication channel may be wireless (e.g., radio communications), there may be a wired connection to the data consumer 104, the data producer 102 may communicate over the Internet, and so on. The particular form of the communication channel may vary from one data producer 102 to another, depending on available communication or other infrastructure, local governmental regulations, and so on.

In accordance with the present disclosure, the data consumer 104 may communicate with a key managing authority 106 as part of the computational activity conducted by the data consumer. The key managing authority 106 may be provided with a decryption key ($key_D$) that is part of the cryptographic component of the homomorphic cryptographic system 108. The role of the key managing authority 106 will be explained in more detail below. The data consumer 104 may communicate with the key managing authority 106 over any suitable communication network; e.g., a public switched telephone network (PSTN), and so on. In accordance with the present disclosure, the data consumer 104 and the key managing authority 106 should be separate systems and should be operated as separate independent business entities.

Figure 2:
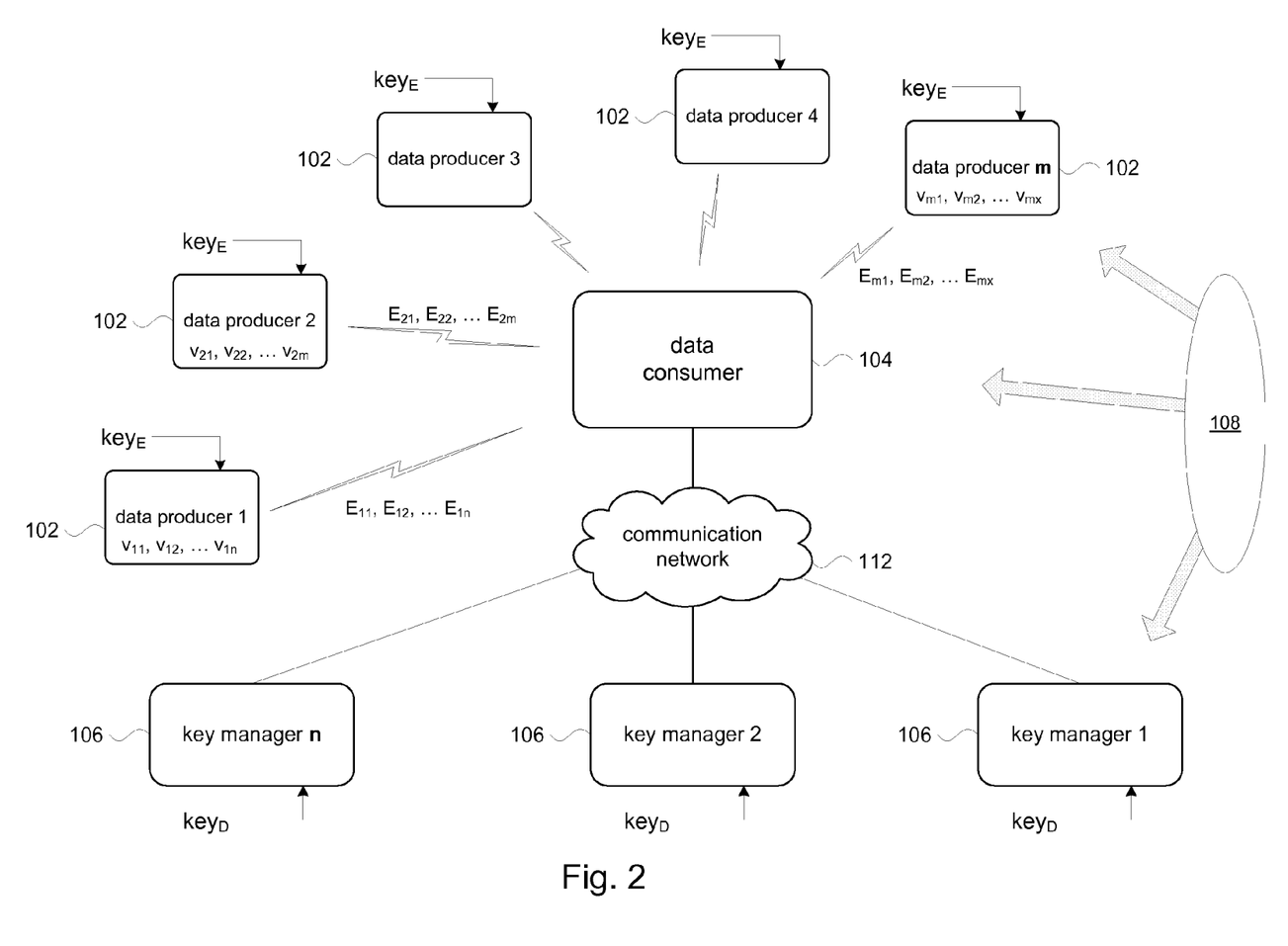
FIG. 2 shows a distributed arrangement of key managing authorities.

FIG. 2 illustrates an embodiment in which the functionality of the key managing authority 106 is distributed. For example, in an embodiment, a plurality of key managing authorities 106 may be provided.

In some embodiments of the present disclosure, the homomorphic cryptographic system 108 implements a version of the Paillier cryptosystem. It will be appreciated that other homomorphic cryptosystems may be used. The Paillier cryptosystem defines two functions:

$$E(m,r) \to c \quad (1)$$

$$D(c) \to (D_v(c), D_r(c)) \to (m,r) \quad (2)$$

Eqn. 1 encrypts a message $m \in Z_n$ with a random value $r \in Z_n^*$ to generate the ciphertext $c \in Z_{n^2}^*$. In embodiments, encryption key ($key_E$) and decryption key ($key_D$) may be a public key/private key pair provided by the key managing authority 106. Each data producer 102 may implement Eqn. 1 using public encryption key ($key_E$), where m is a data value produced by the data producer that is to be encrypted and r is a random parameter, the inclusion of which makes attacks on the ciphertext c to recover message m very difficult.

Eqn. 2 decrypts ciphertext c to produce a tuple (m,r). In embodiments, Eqn. 2 may be implemented in the key managing authority 106 using private decryption key ($key_D$). It will be understood that the private decryption key ($key_D$) is known only to the key managing authority 106.

The Paillier cryptosystem is characterized with the following homomorphic properties (relationships):

$$D(E(m_1, r_1) \times E(m_2, r_2) \bmod n^2) = (m_1 + m_2, r_1 \times r_2) \bmod n \quad (3)$$

$$D(E(m,r)^k \bmod n^2) = (km, r^k) \bmod n \quad (4)$$

In the discussions which follow, whenever we refer to the encryption operation E (Eqn. 1) or the decryption operation D (Eqn. 2) applied to either singular values (plaintext or ciphertext) or vectors of values, the operation yields what makes most sense in the respective context, namely singular values are encrypted (decrypted) to singular values and a vector of values is encrypted (decrypted) to a vector of values. The operation $X \cup v$ appends scalar value $v$ to the vector X. In addition, for improved readability, the notation $f \circ h(x)$ refers to the sequential composition of functions $f$ and h, thus $f(h(x))$.

Figure 3:
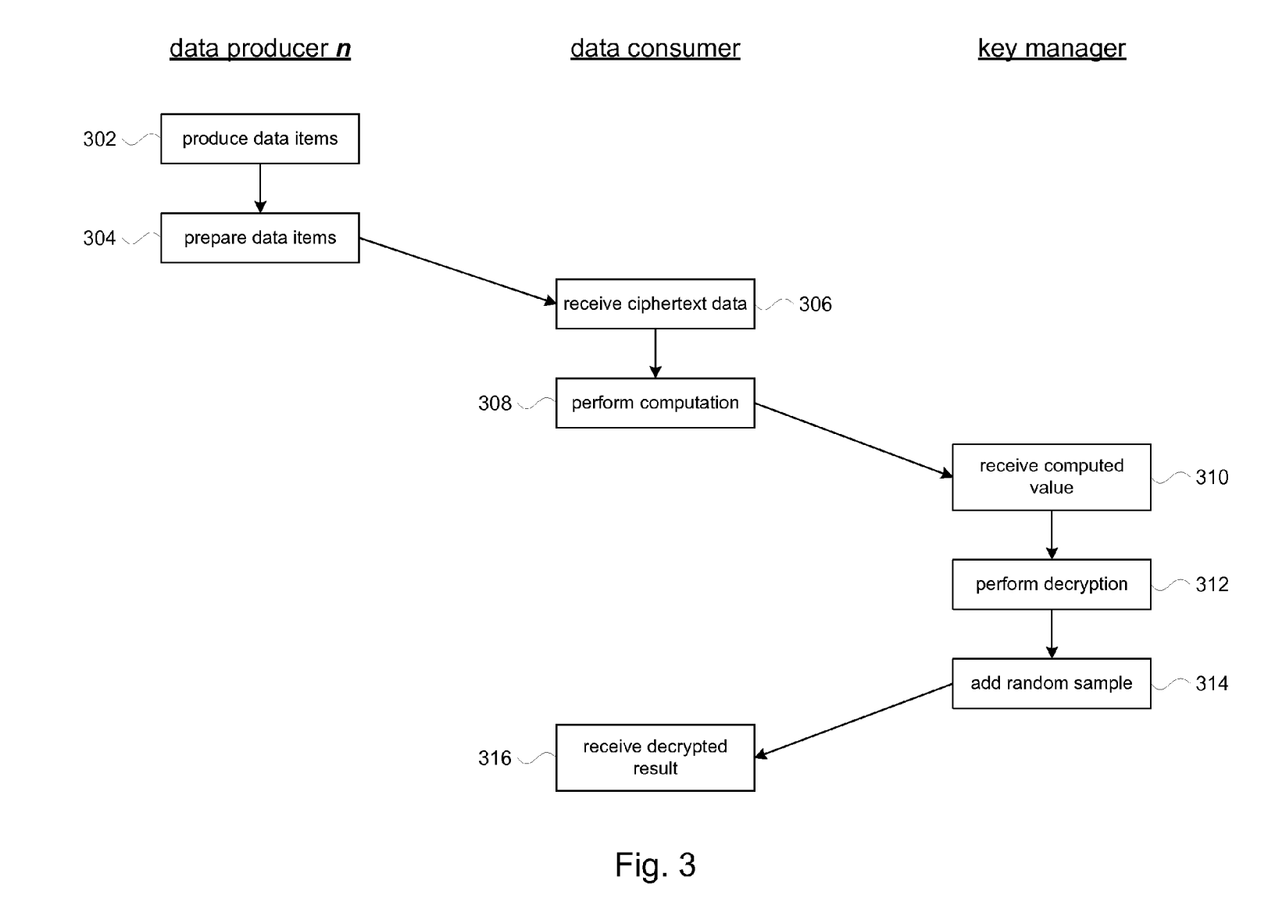
FIG. 3 illustrates an embodiment of a naïve protocol.

Referring now to FIG. 3, processing in accordance with a so-called "naïve" version of a fault-tolerant, differentially private statistics protocol in accordance with the present disclosure will now be discussed. The idea of "differential privacy" will be explained below. The discussion will describe, without loss of generality, one round of communication from the data producers 102 to the data consumer 104, and one subsequent function evaluation and decryption. The basic goal is for the data consumer 104 to collect data from the data produces 102, and perform statistical analysis on the collected data. However, this needs to be accomplished without letting the data consumer 104 know the actual data values generated by the data producers 102.

In a step 302, each data producer 102 generates measurement data that is the subject of interest to the data consumer 104. In an embodiment, for example, the data producers 102 may be electrical utility smart meters installed on residential premises and in businesses. They may generate a data reading every minute. The electrical utility provider would be interested in receiving such data in order to perform various statistical analyses on the data to improve their operations. In another example, the data producers 102 may be blood pressure monitors worn by volunteers in a medical study, producing a blood pressure measurement every hour. The study may be conducted by a drug company wanting to test its blood pressure medicine.

In a step 304, each data producer 102 prepares the measured data for transmission to the data consumer 104. In accordance with an embodiment, every data producer 102 j encrypts its measured data value $v_j$ according to Eqn. 1. Thus, a random number $r_j$ is generated and combined with the data value $v_j$ to produce the ciphertext datum $E(v_j, r_j)$. The data producer 102 sends the ciphertext datum $E(v_j, r_j)$ to the data consumer 104, thus ensuring that no one sees the actual measured value $v_j$.

It can be appreciated that in the general case, the data production step 302 and the data preparation step 304 may be executed repeatedly by each data producer 102. in parallel with respect to the other data producers and asynchronously with respect to the other data producers. In addition, the operations performed in the data producers 102 are not synchronized with the processing that is taking place in the data consumer 104 or the key managing authority 106.

In a step 306, the data consumer 104 receives ciphertext data from the data producers 102. As explained, the data consumer 104 may receive ciphertext data from the data producers 102 at any time and at any rate (e.g., data producer 1 may send 100 data items in a one hour period, while data producer 2 may send 60 data items in the same period). Therefore, in the general case, the data consumer 104 may choose some or all input values that it has received during the entire system run time; i.e. multiple rounds of data item creation. Suppose, the data consumer 104 chooses a vector:

$$V = \{E(v_1, r_1), \ldots, E(v_m, r_m)\} \quad (5)$$

out of all the ciphertext data that the data consumer has received, for m of the data producers 102. In an embodiment, none of the data items in the vector V include ciphertext data that were previously used. This aspect of the present disclosure will be discussed below.

In a step 308, the data consumer 104 performs a computation on the received ciphertext data. Without loss of generality, we can assume that data consumer 104 and key managing authority 106 have pre-arranged a function $f$ that the data consumer 104 wishes to evaluate on the plaintext data $v_j$; e.g., some suitable statistical function. For example, if the data consumer 104 wishes to compute a statistics function of the form:

$$f((x_1, \ldots, x_m), c) = \left(\sum_{i=1}^{m} a_i \times x_i\right) + c, \quad (6)$$

then the data consumer may evaluate $f$'s homomorphic counterpart, $f_h$:

$$f_h(V, E(c, r_c)) = \left(\prod_{i=1}^{m} E(v_i, r_i)^{a_i}\right) \times E(c, r_c), \quad (7)$$

where $a_i$ are constants, $r_c = 1$, and c is a "blinding term" that is chosen (e.g., randomly) by the data consumer 104. The specific form of $f_h$ is derived from the homomorphic relationships defined in Eqns. 3 and 4.

The computed value $f_h(V,E(c,1))$ produced by Eqn. 7 is encrypted, being computed from encrypted data. In accordance with principles of the present disclosure, the computed value may be sent to the key managing authority 106 for further processing. Thus, in a step 310 the key managing authority 106 receives the computed value from the data consumer 104. In a step 312, the key managing authority 106 may perform the following decryption operation:

$$D_v \circ f_h(V,E(c,1)) \quad (8a)$$

where, the decryption operation performed by the key managing authority 106 uses the private decryption key (key$_D$) stored in the key managing authority. An output of Eqn. 8a is a plaintext result that represents the same statistic that would have resulted if the function $f$ had been applied directly to the data items $v_j$ from the data producers 102, namely:

$$D_v \circ f_h(V,E(c,1)) = f \circ D_v(V,E(c,1)) \quad (8b)$$

The blinding term c added to the computed value $f_h(V,E(c,1))$ by the data consumer 104 serves to prevent the disclosure of the statistic result to the key managing authority 106. Thus, even though the key managing authority 106 decrypts the computed value, the addition of the blinding term c renders the plaintext result essentially meaningless to the key managing authority 106 since it has no idea of the value of the blinding term c.

In a step 314, a random sample is added to the plaintext result produced in step 312. In an embodiment, a function $m_f(s,x)$ may be provided to add a random sample according to a sensitivity of function $f$ and a seed s to make the plaintext result of function $f$ "differentially private". A formalistic definition of differential privacy is the following:

Definition: A randomized function K gives $\epsilon$-differential privacy if for all data sets $D_1$ and $D_2$ differing on at most one element and all $S \subset C$ Range(K), $$Pr[K(D_1) \in S] \le \exp(\epsilon) \cdot Pr[K(D_2) \in S] \quad (9)$$

In other words, the likelihood of any function result will only marginally change with the presence (or absence) of one additional element. Consequently, even with knowledge of the data set and arbitrary auxiliary information, it is hard for an attacker to identify whether an element is present or not. Thus, the actual value of the element is protected. The parameters must be chosen according to the use case at hand. The parameter $\epsilon$ represents the desired tradeoff between accuracy of the function K and how well it preserves privacy. In an embodiment, the function $m_f(s,x)$ may be chosen so that it yields values according to a symmetric geometric distribution Geom($\exp(\epsilon/\delta)$) where $\delta$ is the sensitivity of function $f$.

In a step 316, the data consumer 104 receives, from the key managing authority 106, a decrypted plaintext result representative of the computed value $f_h(V,E(c,1))$ that was produced in step 308, with the addition of the random noise from step 314. Accordingly, the data consumer 104 receives the differentially private plaintext result:

$$m_f(s) \circ D_v \circ f_h(V,E(c,1)).$$

The naïve protocol set forth in FIG. 3 may be used to provide differential privacy in a "semi-honest" model, where we assume that the data consumer 104 abides by the protocol and computes the function as agreed with the key managing authority 106. This includes that the data consumer 104 only chooses data items for a round of computation that have not been used in a prior round of computation. This "freshness" property of the data items, however, is not ensured by the protocol. Thus, in the presence of a malicious data consumer, the naïve protocol illustrated in FIG. 3 may not adequately protect data items from re-use by such a data consumer.

The re-using of data items has severe implications for differential privacy in a continuous statistics calculation: It is easy to determine the necessary parameter for the distribution of the random noise that makes a single function evaluation $\epsilon$-differentially private. It can be shown that if we do not prevent the re-use of data items in a continuous calculation usage scenario, the differential privacy will add up and can become insufficient for the protection of data items. Accordingly, in a "malicious" protocol model, the data consumer 104 is required to prove to the key managing authority 106 that it used "fresh" data items, and that the data consumer correctly evaluated a function that was agreed upon between the data consumer and the key managing authority.

Figure 4:
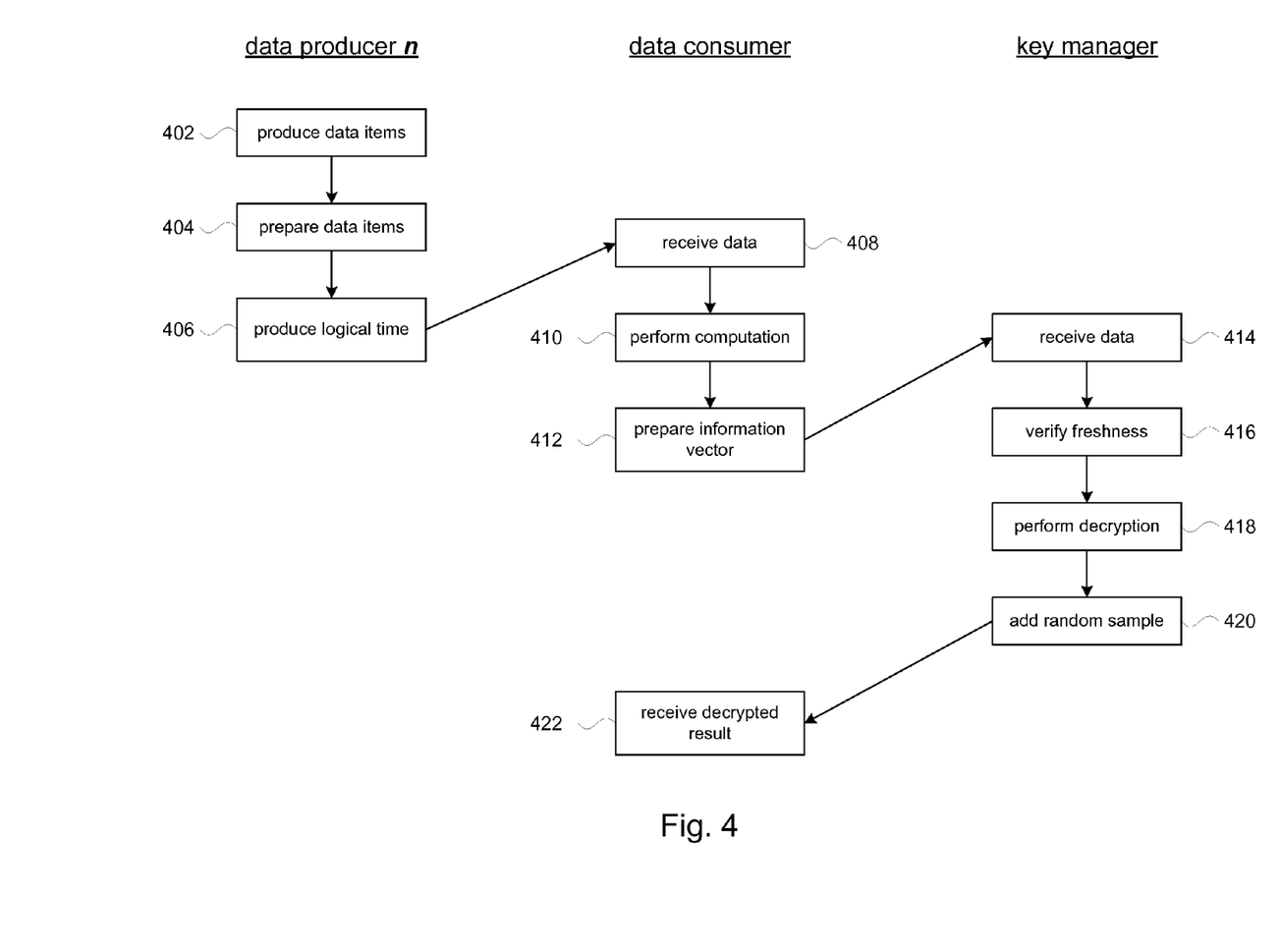
FIG. 4 illustrates an embodiment of a protocol to ensure freshness.

Referring to FIG. 4, a protocol for ensuring the freshness of data items used in a computation is described. The protocol also provides for fault tolerance to make the protocol more resilient to failures among data producers 102. Accordingly, in some embodiments, the key managing authority 106 may be configured to only allow decryption of function results (e.g., step 314) that incorporate fresh data items (i.e., data items that had not been used in previous computations). In a particular embodiment, the key managing authority 106 may further restrict the freshness property as follows: Data items originating from the same data producer 102 can only be used in chronological order; although data items may be skipped. A function $P_j(v)$ may be defined in data producer j which returns the ordinal position ("logical time") of a data item v within the total order of data items of data producer j. The function $P_j(v)$ is executed only within data producer j. For example, suppose data producer 1 (FIG. 1) produced the following ordered sequence of data items:

$$v_{11}, v_{12}, v_{13}, v_{14}, \ldots, v_{1i}, \ldots$$

Data item $v_{11}$ is deemed to have been measured before data item $v_{12}$, data item $v_{12}$ measured before data item $v_{13}$, and so on. A function $P_1(v)$ may be defined in data producer 1 which returns "3" when it is invoked with $P_1(v_{13})$, and in general the function $P_1(v)$ returns "i" when it is invoked with $P_1(v_{1i})$.

The key managing authority 106 may remember, for each data producer 102, which data item (vis-à-vis the data item's logical time) was last used in a calculation. To facilitate, the key managing authority 106 may provide a function C(j) which returns, for data producer j, the ordinal position (or logical time) of the latest data item, from among j's total ordered list of data items, that was used in a calculation.

Turning to FIG. 4, in a step 402 each data producer 102 produces measured data as in FIG. 3. In a step 404, the data producer 102 may encrypt each data item as explained above in connection with FIG. 3. In a step 406, the data producer 102 may generate a logical time value for each data item produced in step 402, using for example, the $P_j(v)$ function described above. The data producer 102 may then send $E(v_j, r_j)$ and $P_j(v_j)$ to the data consumer 104, where j identifies the particular data producer.

In a step 408, the data consumer 104 receives respective $E(v_j, r_j)$ and $P_j(v_j)$ data from each the data producers 102. In a step 410, the data consumer 104 may perform the computation explained above in connection with FIG. 3 to produce a computed value $f_h(V,E(c,1))$. In a step 412, the data consumer 104 may prepare an information vector I using the logical time information $P_j(v_j)$ provided by each data producer 102. In a particular embodiment, we can define $p_i$ as denoting a data producer i. The data consumer 104 may produce the following information vector I to describe the logical times for the input vector V (see Eqn. 5):

$$I=((p_0,P_0(v_0),(p_1,P_1(v_1),\ldots,(p_m,P_m(v_m))) \qquad (10)$$

The data consumer 104 may then send the computed value and the information vector I to the key managing authority 106.

In a step 414, the key managing authority 106 receives from the data consumer 104 the computed value $f_h(V,E(c,1))$ and information vector I. In a step 416, the vector I may be used to verify the freshness of the data that was used by the data consumer 104 to produce the computed value $f_h(V,E(c,1))$. In a particular embodiment, for every $(p_j,P_j(v_j)) \in I$, the key managing authority 106 may check whether the relation $C(p_j)<P_j(v_j)$ holds. If so, then $C(p_j)$ is updated according to: $C(p_j) \leftarrow P_j(v_j)$, and decryption processing may proceed with steps 418 and 420. In particular, the computed value $f_h(V,E(c,1))$ received in step 414 may be decrypted as explained above in FIG. 3, and random noise added to produce a plaintext result having differential privacy, namely $m_f(s) \circ D_v \circ f_h(V,E(c,1))$. In a step 422 the data consumer 104 receives the differentially private plaintext result from the key managing authority 106.

In some embodiments, it may be desirable to distribute the functionality of the key-managing authority 106 across multiple instances of key managing authorities to improve resiliency against failure. FIG. 2 shows an illustrative example of a distributed key managing authority 106. Suppose the total number of key managing authority instances is n=2t+1. In order to ensure adequate freshness processing in each instance of a distributed key managing authority 106, at least a majority (t+1) of instances key managing authority are assumed to be alive at any time. Each key managing authority 106 holds its own version of the function $C(p_j)$.

Figure 5:
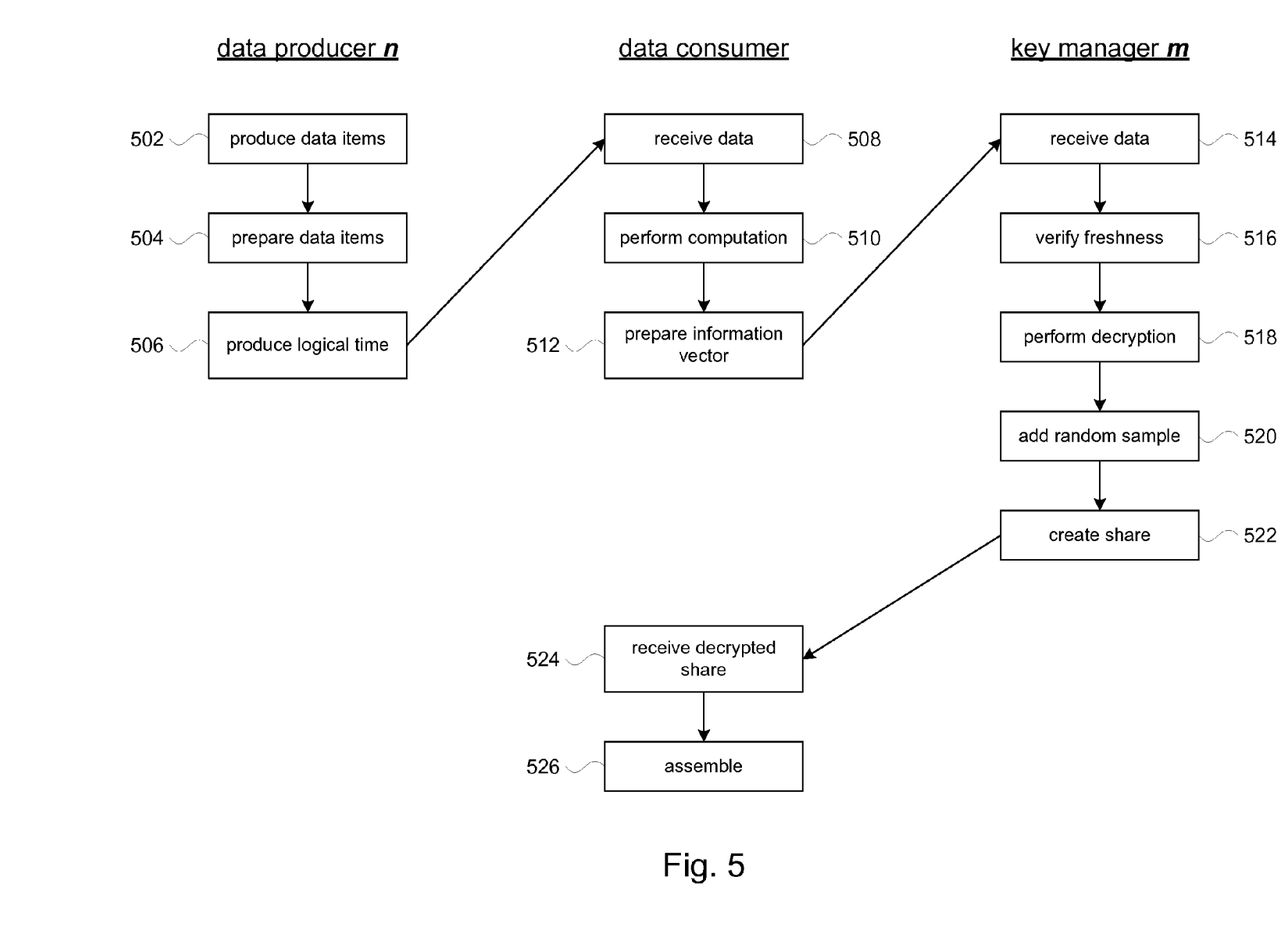
FIG. 5 illustrates an embodiment of a protocol for distributed key managing authorities.

Referring to FIG. 5, a protocol is described for distributed key managing authorities 106. Steps 502, 504, and 506, performed in each data producer 102, are the same as respective steps 402, 404, and 406 in the protocol shown in FIG. 4. Similarly, steps 508, 510, and 512 performed by the data consumer 104 are the same as respective steps 408, 410, and 412 in the protocol shown in FIG. 4. In the protocol of FIG. 5, however, the computed value $f_h(V,E(c,1))$ and the information vector I are sent in step 512 to each instance m of the key managing authority 106.

Therefore, in a step 514, each instance m of the key managing authority 106 receives a copy of computed value $f_h(V,E(c,1))$ and information vector I from the data consumer 104. Each instance m of the key managing authority 106 performs steps 516, 518, and 520 in the same manner as described respective steps 416, 418, and 420 of FIG. 4 to produce a plaintext result having differential privacy, including a check for freshness. Thus, each instance m of the key managing authority 106 computes $x=m_f(s) \circ D_v \circ_v \circ f_h(V,E(c,1))$ at step 520.

In a step 522, each instance m of the key managing authority 106 may create a share $s_m$ of x. In an embodiment, a technique known as Shamir's secret sharing scheme may be used, where the decrypted plaintext result x is the "secret" to be shared. Shamir's algorithm computes a share $s_m$ that is unique to each instance m. All instances m of the key managing authority 106 may use the same random polynomial so that their shares can be re-combined. Also, all instances m may apply the same function $m_f(s)$ so that they create shares of the same value x. We apply the same mechanism (explained in more detail below) to achieve both. The resulting secret share $s_m$ is returned to the data consumer.

In a step 524, the data consumer 104 receives a secret share $s_m$ from at least t+1 instances m of the key managing authority 106. Shamir's algorithm may be used to re-assemble the decrypted result x from the received shares $s_m$, in a step 526. The data consumer 104 has to contact to at least t+1 instances m of the key managing authority 106 in order to obtain enough shares $s_m$ so that it can re-assemble the plaintext result x. Every instance m in this majority will then also update their state C. This means, that subsequently, a malicious data consumer will fail to find a disjoint majority set of instances and thus cannot create partitions of key managing authority instances with different states.

In some embodiments, each instance m of a key managing authority 106 operates independently of other instances of the key managing authority. On the one hand, this is beneficial because it avoids any synchronization problems. On the other hand, every instance m must create valid shares $s_m$ of the same plaintext result x in order to allow successful re-assembly by the data consumer 104. Accordingly, in some embodiments, a mechanism for choosing the function $m_f(s)$ and a secret sharing polynomial can be based on a pseudo-random function seeded with the same seed values across all instances m. We then use the commonly available information vector I as the basis for generating a seed value that is common to each instance m of the key managing authority 106.

In the foregoing embodiments, protocols have been disclosed that allow the key managing authority 106 to decrypt a homomorphically encrypted function result (e.g., $f_h(V,E(c,1))$) and add random noise to the plaintext result in order to guarantee s-differential privacy in the presence of a semi-honest data consumer 104. However, this relies on the key managing authority's knowledge about the sensitivity of the evaluated function $f$, and on the freshness of the data items.

In some embodiments, a "final" protocol that ensures differential privacy over an unbounded number of statistics calculations in case of a malicious data consumer may be provided if we adhere to the following properties:

The key managing authority 106 can verify the correctness of the provided data item information vector I in order to guarantee freshness.

The key managing authority 106 can verify the correct evaluation of a known statistical function on data items provided by data producers 102. This allows the key managing authority 106 an appropriate choice of random noise for making the statistics result differentially private.

As in the naïve protocol of FIG. 3, we can assume, without loss of generality, a prearranged statistics function $f$. The function $P_j(v)$ at data producer j returns the position (logical time) of data item v within the total order of data items of data producer j. At the key managing authority 106 (and, at every instance m in the case of a distributed key managing authority), the function C(j) returns for data producer j the position (logical time) of the latest data item that was used in a statistics calculation in j's total order of data items.

Data Preparation

Every data producer $j \in 1, \ldots, n$ encrypts its data item $v_j$ along with a random number $r_j$ as explained above in connection with FIG. 3. In addition, each data producer 102 encrypts the random number $r_j$ with another chosen random value $r'_j$ and creates signatures over the random number's cipher text and the data item identification tuple:

$$(j,P_j(v_j)):S_j(E(r_j,r'_j),(j,P_j(v_j)))_j.$$

Every data producer 102 then sends to the data consumer 104 the following: $(j,P_j(v_j))$, $E(v_j,r_j)$, $E(r_j,r'_j)$, and $S_j(E(r_j,r'_j),(j,P_j(v_j)))_j$.

Calculation of the Computed Value

As in the protocols above, the data consumer 104 chooses a vector V on which to perform the computation:

$$V=\{E(v_1,r_1),\ldots,E(v_m,r_m)\}$$

from all of the encrypted data items that it received from the data producers 102. In addition, corresponding vectors of the encrypted randoms R, the information vector I, and signatures S are generated to obtain the following set of vectors:

$$V=(V_1,\ldots,V_m)|V_i\in\{E(v_1,r_1),\ldots,E(v_n,r_n)\}$$

$$R=(R_1,\ldots,R_m)|R_i\in\{E(r_1,r_1),\ldots,E(r_n,r_n)\}$$

$$I=(I_1,\ldots,I_m)|I_i\in\{E(1,P_1(v_1)),\ldots,(n,P_n(v_n))\}$$

$$S=(S_1,\ldots,S_m)|S_i\in\{S(E(r_1,r'_1),(1,P_1(v_1)))_1,\ldots,S(E(r_n,r'_n),(n,P_n(v_n)))_j\},$$

where, S(x) is a signing function which creates cryptographic signatures over x.

The data consumer 104 then calculates the computed value $f_h(V,E(c,1))$ as discussed above in connection with the naïve protocol of FIG. 3. The data consumer 104 then sends the computed value $f_h(V,E(c,1))$ and vectors R, I, and S to each available instance m of the key managing authority 106 for decryption and related processing.

Decryption

In each instance m of the key managing authority 106, two checks are performed: First, a freshness check is made as explained above in connection with FIG. 4. For every $I_j=(j,P_j(v_j))\in I$ and $R_j\in R$, a check is made of the corresponding signature $S_j$ and the freshness of every used data item: $C(j)<P_j(v_j)$. If successful, then $C(j)\leftarrow P_j(v_j)$ is performed to update $C(j)$.

Second, is to confirm that the data consumer 104 evaluated a "valid" function; i.e., a function $f$ that was agreed on between the data consumer and the key managing authority. If vector $V=\{E(v_1,r_1),\ldots,E(v_m,r_m)\}$ and there is a function $f'$ that is derived from the function $f$ in accordance with the homomorphic properties set forth in Eqns. 3 and 4, then the following will hold:

$$D_v\circ\theta_h(V,E(c,1))=f'\circ D_v(V\cup E(c,1)), \quad (11)$$

recalling that function $f_h$ is also derived from function $f$ in accordance with the homomorphic properties of Eqns. 3 and 4, and function $f$ is:

$$f((x_1,\ldots,x_m),c)=\left(\sum_{i=1}^{m}a_i\times x_i\right)+c.$$

A function $f'$ may be derived that represents the homomorphic operations on the random part of the ciphertext of function $f$:

$$f'(V)=\prod_{i=1}^{m}D_r(E(v_i,r_i))^{a_i}.$$

Each instance m of the key managing authority 106 checks if:

$$D_r\circ f_h(V,E(c,1))=f'\circ D_v(R).$$

If both checks are confirmed, then a random sample is added to the plaintext result having differential privacy, as explained in the naïve protocol of FIG. 3. Each instance m of the key managing authority 106 then computes its share $s_m$ of the plaintext result as explained in FIG. 5 and sends its share to the data consumer 104. The data consumer 104 may then assemble the shares received from several instances of the key managing authorities to produce the plaintext differentially private result $D_v(m_f(I)\circ f_h(V,E(c,1)))$ as explained in FIG. 5.

Figure 6:
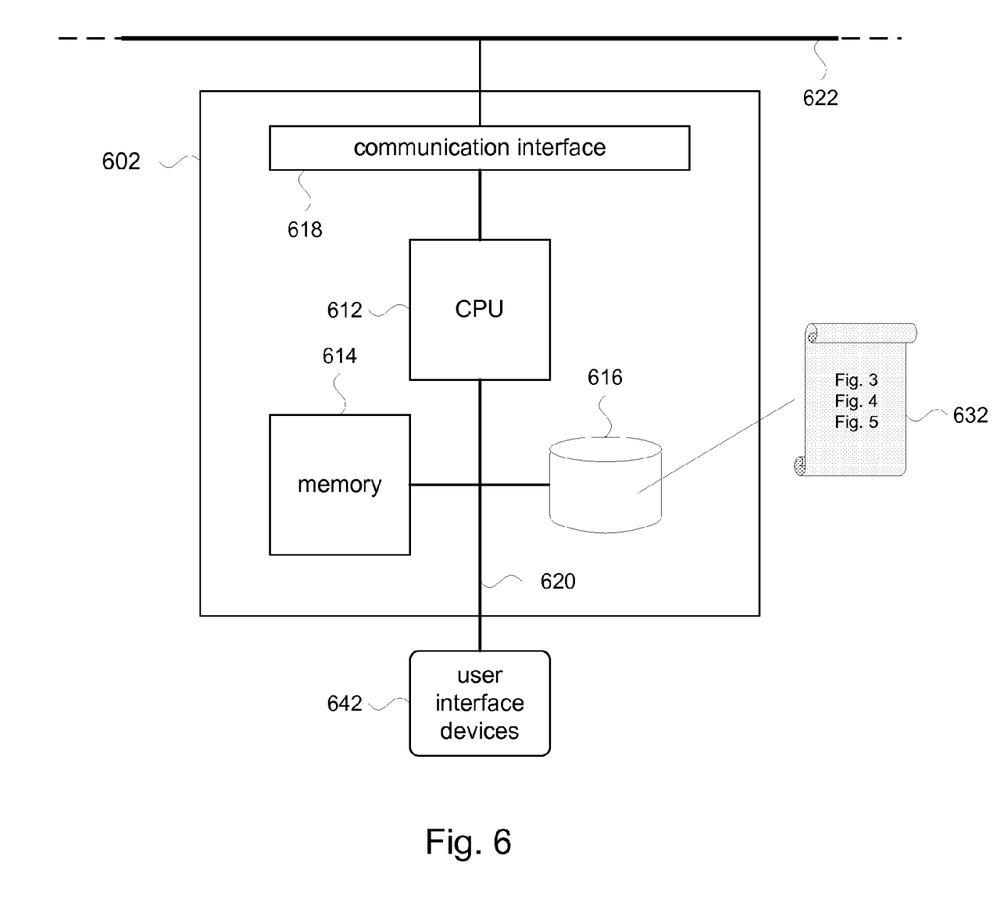
FIG. 6 shows a block diagram of a computer system configured in accordance with the present disclosure.

FIG. 6 is a high level block diagram of a computer system 602 configured to operate in accordance with the present disclosure. The computer system 602 includes a central processing unit (CPU) or other similar data processing component. The computer system 602 may include various memory components. For example, the memory components may include a volatile memory 614 (e.g., random access memory, RAM) and a data storage device 616. A communication interface 618 may be provided to allow the computer system 602 to communicate over a communication network 622, such as a local area network (LAN), a PSTN, and so on. An internal bus 620 may interconnect the components comprising the computer system 602.

The data storage device 616 may comprise a non-transitory computer readable medium having stored thereon computer executable program code 632. The computer executable program code 632 may be executed by the CPU 612 to cause the CPU to perform steps of the present disclosure. For example, the data consumer 104 may comprise a computer system such as computer system 602. The executable program code 632 may cause the data consumer 104 to perform in accordance with the protocols shown in FIGS. 3-5. The key managing authority 106 may comprise a computer system such as computer system 602, where the executable program code 632 may cause the key managing authority 106 to perform in accordance with the protocols shown in FIGS. 3-5.

A user may interact with the computer system 602 using suitable user interface devices 634. They may include, for example, input devices such as a keyboard, a keypad, a mouse or other pointing device, and output devices such as a display.

Advantages and Technical Effect

Real-time statistics on smart meter consumption data must preserve consumer privacy and tolerate smart meter failures. Existing protocols for this private distributed aggregation model suffer from various drawbacks that disqualify them for application in the smart energy grid. Either they are not fault-tolerant or if they are, then they require bidirectional communication or their accuracy decreases with an increasing number of failures.

We have disclosed a protocol for a fault-tolerant, private distributed aggregation model: Many data producers constantly produce sensitive data items. An un-trusted data consumer calculates statistics, e.g., for forecasting future consumption, over subsets of these data items in the presence of failing data producers. Not even a collusion of malicious data producers and consumer may lead to the disclosure of sensitive data items.

Advantages of the present disclosure include:
  The accuracy of the calculated statistics is higher than in other existing protocols. Accuracy is independent of the number of data producers, the number of data items, and the number of failures.
  We do not require synchronized clocks, but only rely on logical time.
  Our protocol enables the calculation of a wider range of statistical functions (weighted sums). The statistical function can be chosen and exchanged intermittently by the data consumer without notification to the data producers.

We do not require any group key management. Data producers may join or leave without interaction with other participants.

We only require unidirectional communication channels between data producers and data consumers. This implies a reduced attack surface of the smart meter.

The communication cost in our systems is linear. We assume that many (unsynchronized) data producers constantly produce sensitive data items. The data producers send these items to the data consumer over a unidirectional communication channel. Thus, every data producer has a constant communication cost per data item. The data consumer queries the key-managing authority for decryption over a bi-directional channel. Thus, the communication cost for communicating with the key-managing authority is linear in the number of calculated statistics.

Accuracy of the data consumer's calculated statistics is independent of the number of data producers or data producer failures. Any error in accuracy is introduced deliberately to ensure differential privacy and that has a computational complexity of $O(1)$ with respect to the number of data producers or failures.

Fault tolerance is achieved by a selection process of the data consumer. The data consumer can arbitrarily select a subset of available data items as input to the statistics calculation. Consequently, the present disclosure tolerates an arbitrary and unbounded number of failing data producers. The key-managing authority can also be distributed and we only require a majority of key-managing authority instances to be available during a run of the protocol.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A method in a first system for performing a computation that is representative of applying a function $f$ on a plurality of plaintext data, the method comprising:

receiving with a computer ciphertext data from a plurality of utility meters ("data producers,") the ciphertext data being obtained respectively from the plaintext data using an encryption algorithm of a homomorphic cryptographic system;

producing a computed value from the ciphertext data using a function $f_h$ that is derived from the function $f$ using a relationship defined by the homomorphic cryptographic system, the computed value being an encrypted value;

sending the computed value to a second system separate from the first system;

receiving from each data producer $p_j$ an ordinal value $P_j$ associated with the plaintext datum that is represented by the ciphertext datum sent by the data producer, and sending the ordinal value $P_j$ received from each data producer to the second system, wherein the second system uses the received ordinal value $P_j$ to determine whether the data used to generate the computed value in the first system have been used to generate a previous computed value; and receiving from the second system an extracted value generated by the second system using a decryption operation on the computed value, the extracted value being a plaintext value representative of a computed result produced by applying the function $f$ on the plurality of plaintext data, wherein the plurality of data producers are separate from the first system and the second system, wherein the first system is a system in a utility company.

2. The method of claim 1 wherein the ciphertext data have a one-to-one correspondence with the data producers.

3. The method of claim 1 wherein the ciphertext data are encrypted using an encryption key that is common to each of the data producers, wherein the second system uses a decryption key to decrypt the computed value received from the first system.

4. The method of claim 3 wherein the encryption key is a public key portion of a public key/private key cryptographic system, wherein the decryption key is a private key portion of the public key/private key cryptographic system.

5. The method of claim 1 wherein the first system includes a blinding term among the plurality of ciphertext data when producing the computed value.

6. The method of claim 1 wherein the second system incorporates a random sample term in the extracted value.

7. The method of claim 1 wherein a plurality of computed values are produced from the ciphertext data, wherein each computed value is sent to a second system from among a plurality of second systems, wherein at least some of the second systems each returns a shared value, the method further comprising combining the received shared values to produce a result that represents a computed result produced by applying the function $f$ on the plaintext data.

8. A system comprising:

a central processing unit; and a data storage device having stored thereon computer executable program code, wherein when the central processing unit executes the computer executable program code, the central processing unit:

receives ciphertext data from a plurality of utility meters ("data producers,") the ciphertext data being obtained respectively from the plaintext data using an encryption algorithm of a homomorphic cryptographic system;

produces a computed value from the ciphertext data using a function $f_h$ that is derived from the function $f$ using a relationship defined by the homomorphic cryptographic system, the computed value being an encrypted value;

sends the computed value to a decryption system separate from the system;

receives from each data producer $p_j$ an ordinal value $P_j$ associated with the plaintext datum that is represented by the ciphertext datum sent by the data producer, and sends the ordinal value $P_j$ received from each data producer to the decryption system, wherein the decryption system uses the received ordinal value $P_j$ to determine whether the data used to generate the computed value in the first system have been used to generate a previous computed value; and receives from the decryption system an extracted value generated by the decryption system using a decryption operation on the computed value, the extracted value being a plaintext value representative of a computed result produced by applying the function $f$ on the plurality of plaintext data, wherein the plurality of data producers are separate from the first system and the second system, wherein the system is a system in a utility company.

9. The system of claim 8 wherein the ciphertext data are encrypted using an encryption key that is common to each of the data producers, wherein the decryption system uses a decryption key to decrypt the received computed value.

10. The system of claim 9 wherein the encryption key is a public key portion of a public key/private key cryptographic system, wherein the decryption key is a private key portion of the public key/private key cryptographic system.

11. The system of claim 8 wherein a blinding term is included among the plurality of ciphertext data when producing the computed value.

12. The system of claim 8 wherein the decryption system incorporates a random sample term in the extracted value.

13. The system of claim 8 wherein a plurality of computed values are produced from the ciphertext data, wherein each computed value is sent to an instance of a plurality of decryption system, wherein at least some of the instances of the decryption systems each returns a shared value, the method further comprising combining the received shared values to produce a combined result that represents a computed result produced by applying the function $f$ on the plaintext data.

14. A non-transitory computer readable storage medium having stored thereon computer executable program code, which when executed by a computer processor causes the computer processor to perform steps of:
receiving ciphertext data from a plurality of utility meters ("data producers,") the ciphertext data being obtained respectively from plaintext data using an encryption algorithm of a homomorphic cryptographic system;
producing a computed value from the ciphertext data using a function $f_h$ that is derived from the function $f$ using a relationship defined by the homomorphic cryptographic system, the computed value being an encrypted value;
sending the computed value to a second system separate from the first system;
receiving from each data producer $p_j$ an ordinal value $P_j$ associated with the plaintext datum that is represented by the ciphertext datum sent by the data producer, and sending the ordinal value $P_j$ received from each data producer to the second system, wherein the second system uses the received ordinal value $P_j$ to determine whether the data used to generate the computed value in the first system have been used to generate a previous computed value; and
receiving from the second system an extracted value generated by the second system using a decryption operation on the computed value, the extracted value being a plaintext value representative of a computed result produced by applying the function $f$ on the plurality of plaintext data,
wherein the plurality of data producers are separate from the first system and the second system,
wherein the computer processor is processor in a utility company.

15. The non-transitory computer readable storage medium of claim 14 wherein the ciphertext data are encrypted using an encryption key that is common to each of the data producers, wherein the second system uses a decryption key to decrypt the computed value received from the first system.

16. The non-transitory computer readable storage medium of claim 15 wherein the encryption key is a public key portion of a public key/private key cryptographic system, wherein the decryption key is a private key portion of the public key/private key cryptographic system.

17. The non-transitory computer readable storage medium of claim 14 wherein the first system includes a blinding term among the plurality of ciphertext data when producing the computed value.

18. The non-transitory computer readable storage medium of claim 14 wherein the second system incorporates a random sample term in the extracted value.

* * * * *